United States Patent [19]

Murrell et al.

[11] Patent Number: 4,774,855
[45] Date of Patent: Oct. 4, 1988

[54] APPARATUS FOR PROVIDING AN ELECTRICAL GENERATOR WITH A CONSTANT ROTATIONAL SPEED FROM A VARIABLE SPEED INPUT

[75] Inventors: Peter W. Murrell; John Calverley, both of Cumbria, England; Donald Williams; Douglas J. Thomas, both of Powyf, Wales

[73] Assignee: Vickers Shipbuilding and Engineering Limited

[21] Appl. No.: 819,197

[22] Filed: Jan. 15, 1986

Related U.S. Application Data

[63] Continuation-in-part of Ser. No. 408,865, Aug. 17, 1982, abandoned.

[51] Int. Cl.⁴ ............................................. F16H 47/04
[52] U.S. Cl. ...................................... 74/687; 74/411; 74/720
[58] Field of Search .................. 74/664, 681, 687, 705, 74/710, 720, 720.5, 411; 416/170 R; 290/44; 440/75

[56] References Cited

U.S. PATENT DOCUMENTS

| | | | |
|---|---|---|---|
| 3,298,251 | 1/1967 | Moss | 74/687 |
| 3,383,952 | 5/1968 | Christenson | 74/687 X |
| 3,396,607 | 8/1968 | Ross | 74/687 |
| 3,534,631 | 10/1970 | Keller | 74/687 |
| 3,665,788 | 5/1972 | Nyman | 74/687 X |
| 3,667,214 | 6/1972 | Addie | 74/411 X |
| 3,714,846 | 2/1973 | Louis et al. | 74/687 |
| 3,776,796 | 10/1973 | Henriot | 74/411 |
| 3,943,787 | 3/1976 | Hicks | 74/411 X |
| 3,964,334 | 6/1976 | Hicks | 74/411 X |
| 3,983,764 | 10/1976 | Hicks | 74/411 X |
| 4,040,508 | 8/1977 | Sunada et al. | 192/12 D |
| 4,232,570 | 11/1980 | Gibson | 74/687 |
| 4,259,881 | 4/1981 | Meyerle | 74/687 |
| 4,341,132 | 7/1982 | Burdick | 74/687 |
| 4,353,269 | 10/1982 | Hiersig | 74/687 X |
| 4,461,957 | 7/1984 | Jallen | 290/44 |
| 4,663,714 | 5/1987 | Cornell et al. | 74/687 X |

FOREIGN PATENT DOCUMENTS

| | | |
|---|---|---|
| 833273 | 4/1960 | United Kingdom . |
| 867316 | 5/1961 | United Kingdom . |
| 952982 | 3/1964 | United Kingdom . |
| 957573 | 5/1964 | United Kingdom . |
| 1097253 | 1/1968 | United Kingdom . |
| 1213178 | 11/1970 | United Kingdom . |
| 1381477 | 1/1975 | United Kingdom . |
| 1537730 | 1/1979 | United Kingdom . |
| 2042224 | 2/1980 | United Kingdom . |
| 1563698 | 3/1980 | United Kingdom . |
| 1601467 | 10/1981 | United Kingdom . |

OTHER PUBLICATIONS

*Allen Engineering Review*, "Shaft-Alternators Driven Via Variable Ratio Epicyclic Gears", Poole; 11/1965.

Primary Examiner—Leslie A. Braun
Assistant Examiner—Dwight G. Diehl
Attorney, Agent, or Firm—Arnold S. Weintraub

[57] ABSTRACT

An electrical generator drive which comprises a power source able to transmit power at a rotational speed which may fluctuate substantially in service, an electrical generator which requires a rotational input of power at a substantially constant speed, and a controllable drive transmission of high rotational inertia coupling together the power source and the electrical generator. The drive transmission comprises an epicyclic gear having an input member driven by the power source, an output member coupled with the electrical generator, and a reaction member, a monitoring device responsive to fluctuations from a predetermined value in the rotational speed of the output member, and a control device including a hydraulic pump/motor unit coupled with the reaction member and controllable by the monitoring device in order to vary the relative rotation between the reaction member and the other members of the epicyclic gear so as to maintain a substantially constant predetermined speed of the output member. To enable the generator drive to respond rapidly to speed fluctuations of the power source, so as to maintain an substantially constant input speed to the generator, the monitoring device includes an electronic control unit having a memory which is programmed with a predetermined value corresponding to the required input speed to the generator derived from the output member. Further, in view of the high rotational inertia of the drive transmision, at least one flexible coupling is provided in the transmission to absorb torsionally any speed fluctuation imparted to the transmission by the power source.

8 Claims, 4 Drawing Sheets

APPARATUS FOR PROVIDING AN ELECTRICAL GENERATOR WITH A CONSTANT ROTATIONAL SPEED FROM A VARIABLE SPEED INPUT

CROSS REFERENCE TO CO-PENDING APPLICATION

The subject application is a continuation-in-part application of co-pending application Ser. No. 408,865 (now abandoned) filed on Aug. 17, 1982 in the names of Peter W. Murrell, John Calverley and Donald Williams entitled APPARATUS FOR PRODUCING A CONSTANT ROTATIONAL SPEED FROM A VARIABLE SPEED INPUT.

BACKGROUND OF THE INVENTION

This invention relates to an electrical generator drive having a power source which is liable to transmit power at a rotational speed which may fluctuate substantially in service, an electrical generator which requires a rotational input of power at a substantially constant speed, and a controllable drive transmission of high rotational inertia coupling together the power source and the electrical generator.

1. Field of the Invention

The invention is particularly concerned with an electrical generator device which derives power from a power source which provides a speed output which can vary quite substantially in service, particularly the main engine on a marine vessel driving the propeller, though other examples of fluctuating power source with which the invention may be used include wind or water-powered devices. On a marine vessel, it is usual to employ an A.C. generator, but if the input speed to the generator varies, the frequency of the current produced will also vary, causing problems with some electrical equipment. For example, clocks will not keep correct time, and AC motors will run at variable speeds. Similarly, if a DC generator is used, the voltage of the current produced will also vary.

The generation of electrical power on board a ship can be derived from the prime mover of the ship, when it is not in port, since this is more economical than to operate a secondary auxiliary engine. However, a disadvantage of using the prime mover is that its speed, and that of the drive train, from the primer mover to an AC generator, may vary depending upon external factors e.g, if the ship is sailing through a storm. When a ship is cruising at a nominally constant speed, it might be expected that the engine(s) and propeller(s) would be rotating at a constant speed, but this is not always the case. Factors such as the roll of the ship, wave motion, changes in local water temperature and density, for example, can lead to a surprisingly large and random variation in the propeller speed. Thus, if a powered generator is driven via the prime mover drive train, any variation of the speed of rotation of the propeller shaft will be magnified by the gear ratio of a take-off drive to the generator, so that the rotational speed of the generator will vary through a greater magnitude speed range. In modern ships, alternating current power is generally used so that, if the speed of the AC generator varies, the current produced will have a variable frequency.

2. Description of the Prior Art

It has become common practice to electronically rectify the variable frequency to stabilize the frequency of the variable current produced from shaft driven generators, but for a large ship with a power requirements of between 0.5 and 1 MW, the physical size of the electronic equipment and the associated power loss pose severe problems for ship designers and operators.

Also, the generation of electrical power from natural sources, such as air or wind-driven devices, or water driven devices, e.g. turbines driven by tidal or other currents and devices arranged to extract energy from wave motion, usually suffers from the common disadvantage of fluctuation in the output speed of the device.

It is known from U.S. Pat. No. 3,298,251 to provide an electrical generator drive which is intended specifically for use with a turbo-jet engine. However, in this case the power source (the turbo-jet engine) will normally provide input power at a substantially constant speed, or at least the input speed to the generator drive will vary only gradually following operation of the throttle of the engine. Further, a hydraulic governor unit is provided in order to maintain a substantially constant input speed to the generator, and a governor unit of this type is particularly suitable for following progressive speed changes which would occur in service with a turbo-jet engine.

By contrast, the invention is concerned with providing an electrical generator drive which derives power from a power source which provides a rotational input of power to the generator which may fluctuate quite substantially in service, and any changes in speed are step changes, rather than progressive alterations in speed. Furthermore, the controllable drive transmission in an electrical generator drive according to the invention has a very high rotational inertia, and this magnifies the adverse effects of step changes in input speed to the generator drive from the power source.

SUMMARY OF THE INVENTION

According to the invention there is provided an electrical generator drive comprising a power source which is liable to transmit power at a rotational speed which may fluctuate substantially in service, an electrical generator which requires a rotational input of power at a substantially constant speed, and a controllable drive transmission of high rotational inertia coupling together the power source and the electrical generator, said drive transmission comprising:

an epicyclic gear having an input member which is arranged to be driven by said power source, an output member coupled with said electrical generator and a reaction member;

monitoring means arranged to respond to fluctuations from a predetermined value in the rotational speed of the output member;

and control means including a hydraulic pump/motor unit coupled with said reaction member and controllable by the monitoring means in order to vary the relative rotation between the reaction member and the other members of the epicyclic gear so as to maintain a substantially constant predetermined speed of the output member;

in which:

the monitoring means includes an electrical control unit having a memory storable with a predetermined value corresponding to the predetermined speed of the output member, means for feeding to the control unit an input signal which represents the actual speed of the output member and which the control unit compares with the predetermined speed of the output member, and a control line from the control unit to said pump- /motor unit via which the control unit controls the operation of the pump/motor unit to cause alteration in the relative rotation of the reaction member, when a fluctuation occurs in the speed of the output member, and such as to restore the speed of the output member to a predetermined speed;

and the drive transmission also includes at least one flexible coupling for torsionally absorbing at least part of any speed fluctuation imparted to the drive transmission via the power source and the input member.

An electrical generator drive according to the invention is particularly suitable for use on board ship, in which the prime mover of the ship is used as the power source. However, other power sources may be employed, including air or wind driven devices, or water driven devices.

When the electrical generator drive is used on board ship, substantially constant frequency electrical power can be obtained by driving a marine generator from the output member of the epicyclic gear. Marine generators usually run at either 1200 or 1800 r.p.m., in order to generate 60 Hz electricity, in which case it is preferable to provide a variable ratio step-up drive when the ship is powered by a diesel engine. However, if the prime mover for the ship is a turbine, a variable ratio step-down drive could be more appropriate.

DESCRIPTION OF THE PREFERRED EMBODIMENTS

Figure 1:
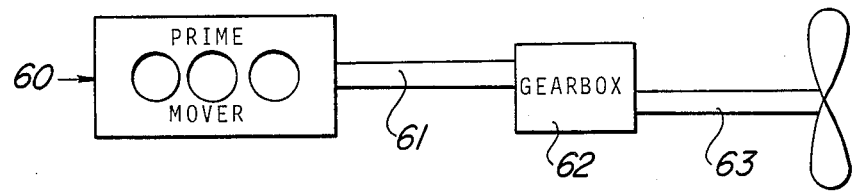
FIG. 1 is a schematic illustration of a marine drive train which may be used as the power source for an electrical generator drive according to the invention, the drive train having a prime mover, a propeller shaft and a gearbox coupling together the prime mover and the propeller shaft.
Figure 2:
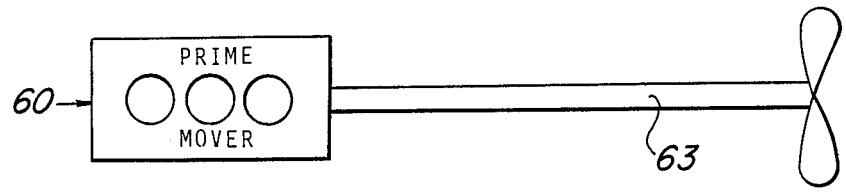
FIG. 2 is a similar illustration of a marine drive train without a gearbox.

Referring now to the drawings, FIGS. 1 and 2 show diagrammatically the basic layouts of conventional ship drive trains. FIG. 1 shows a prime mover, e.g. a slow or medium speed diesel engine or turbine, driving the propeller via a reduction gearbox. FIG. 2 shows a similar train in which the prime mover, e.g. a slow speed diesel engine, drives the propeller directly. In the drive train, shown in FIG. 1, there are four possible power take-off points from which the apparatus may receive a fluctuating rotational input which are:

60—From the non-used end of the prime mover drive shaft.
61—From the shaft between the prime mover and gear box.
62—From the gear box.
63—From the propeller shaft.

In FIG. 2, where there is no gear box, points A and D only apply.

Figure 3:
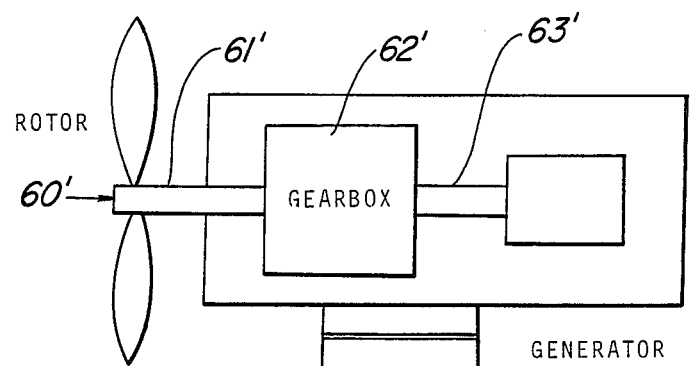
FIG. 3 illustrates a wind turbine drive train which may serve as an alternative power source for the electrical generator drive.
Figure 3:
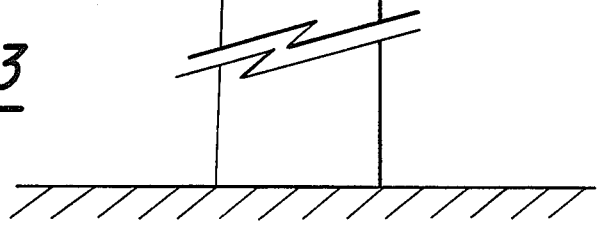

FIG. 3 shows diagrammatically the drive train for an aerogenerator. The drive train comprises a wind turbine of viable speed coupled through the apparatus to a generator. The points of power source for the apparatus, equivalent to positions shown in FIG. 1, are show as 61', 62' and 63', and are:

61 In the shaft between rotor and gear box
62 In the gear box
63 In the gear box output shaft.

In this case, a second power take off from the rotor (60) (equivalent to position 60 in FIG. 1) is not feasible.

An epicyclic gear consists of three basic elements which are the sun wheel, the carrier supporting a plurality of planetary pinions and an annulus gear; anyone of these basic elements may act as the input member, a second may act as the output member and the third will become the reaction member of the epicyclic gear. In order that the ratio of the epicyclic gear, in whatever configuration it is arranged, may be varied, the reaction member may be caused to revolve in either sense of rotation or be held stationary i.e. the relative rotation between the reaction member and the other members of the epicyclic gear may be varied. Thus for a constant, say positive, input speed of rotation, the ratio of the epicyclic gear mauy be infinitely and steplessly varied within given limits by turning the reaction member from its maximum negative speed of rotation, or vice versa through zero to its maximum positive speed of rotation.

Figure 4:
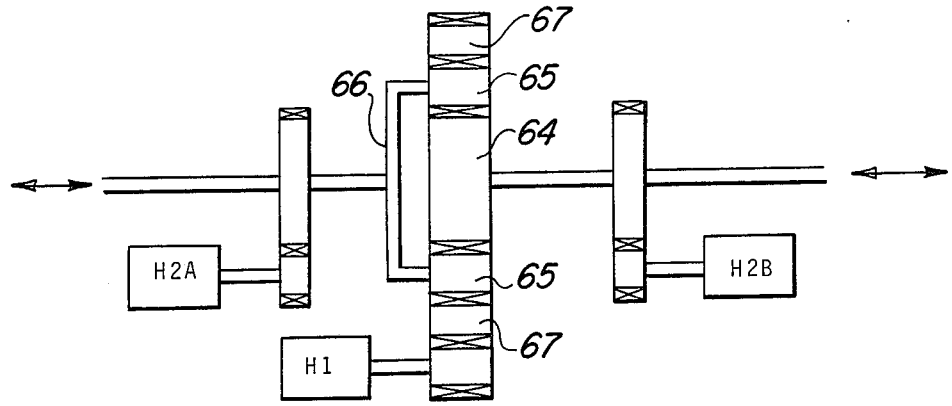
FIG. 4 is a schematic illustration of a variable ratio epicyclic gear, in a planetary arrangement, forming part of the drive transmission.
Figure 5:
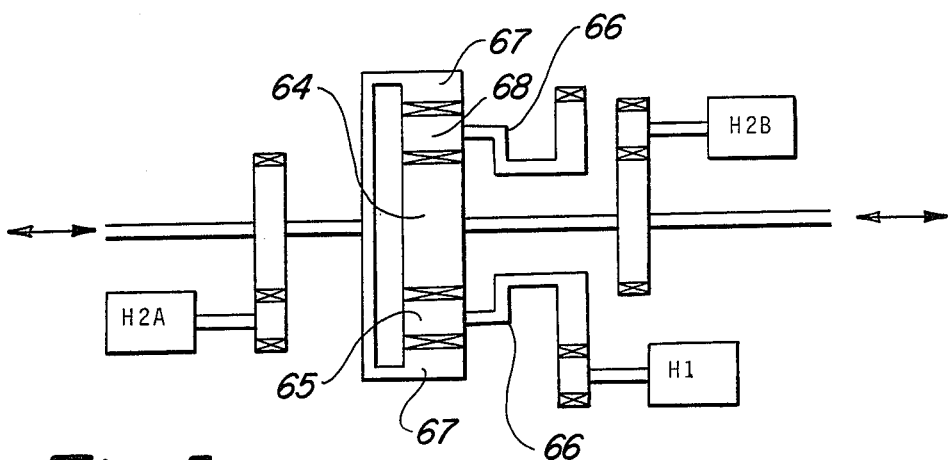
FIG. 5 is an illustration, similar to FIG. 4, of an epicyclic gear in a star arrangement.
Figure 6:
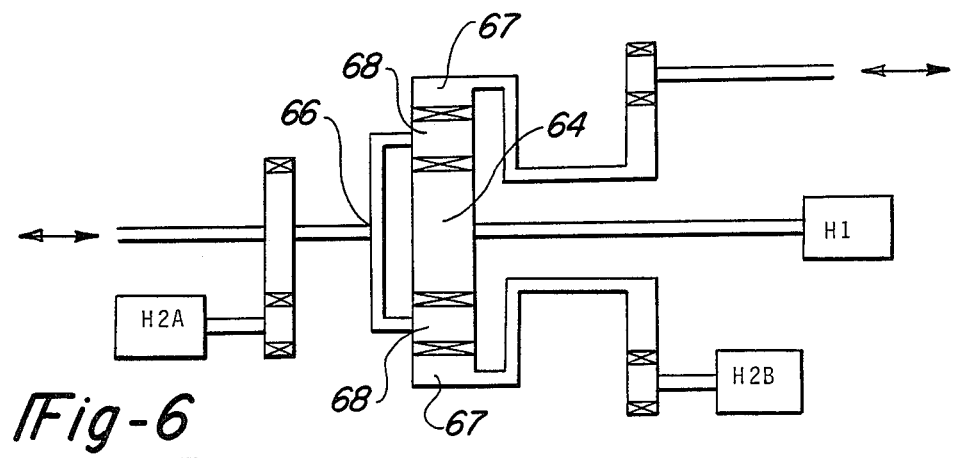
FIG. 6 illustrates an epicyclic gear in a solar arrangement.

FIGS. 4, 5 and 6 show the basic planetary, star and solar epicyclic gear arrangement to achieve the variable-ratio gearing described in the preceding paragraph. In all of FIGS. 4, 5 and 6, solid arrows indicate the movement of power from left to right through the gear trains and this section of the specification is written on this basis; however, the power could equally well pass from right to left, as indicated by the dotted arrowheads. The elements of the epicyclic gear are marked for clarity as follows:

64 for sun wheel
65 for planet pinion
66 for the planet pinion carrier
67 for the annulus wheel The reaction member of the epicyclic gear is the annulus wheel in the planetary arrangement (FIG. 4), the planet carrier in the star arrangement (FIG. 5), and the sun wheel in the solar arrangement (FIG. 6). In each case, the reaction member is rotatably connected to a first hydraulic pump/motor H1, either directly as in FIG. 6 or indirectly via gearing as in FIG. 4 or indirectly via gearing and rotatable structural members as in FIG. 5. Hydraulic pump/motors are usually used in pairs and in FIGS. 4, 5 and 6, the second hydraulic pump/motor may either be rotatably connected via gearing to the input shaft, where it is designated H2A, or to the output shaft where it is designated H2B. Hydraulic pump/motors H1 and either H2A or H2B would be interconnected by two pipes (not shown for clarity) thus forming a closed loop around which hydraulic fluid may be circulated by either one acting as a pump and causing the other to be operated as a motor. In the arrangement described, one of the pair of hydraulic pump/motors H1 or H2A (or H2B) would be fitted with a reversible, variable swash plate so that the quantity and direction of oil being circulated through the closed pipe loop and through the other of said pair of hydraulic pump/motors may be varied. By this means, the speed and sense of rotation of the reaction member may be varied infinitely between a given speed of anticlockwise rotation, through zero (i.e. stationary) to a given speed of clockwise rotation or vice versa. With such an arrangement and a constant speed drive to the input member, an infinitely variable speed may be obtained at the output member e.g. as in UK specification No. 1,097,253. The exact reverse of this is equally possible i.e. obtaining a constant speed output from a variable speed input and it is in this aspect of an epicyclic gear upon which the invention is based. It is, of course, also possible to obtain a variable speed output from a differently variable speed input, but the control problems in such a case are more complex.

The apparatus can receive a rotational input from a ships drive train at any point 60, 61, 62, 63 in FIG. 1, or 60 and 63 in FIG. 2, or 61, 62, or 63 in FIG. 3, to drive at constant speed, a generator via a variable ratio epicyclic gear train. The power required to operate the coupled pair of hydraulic motors controlling the speed and sense of rotation of the reaction member of the epicyclic gear is derived from the ships drive train. One hydraulic pump/motor, H1 is coupled directly to the reaction member, as in FIG. 6, or via gearing to the reaction member as in FIGS. 4 and 5.

Figure 7:
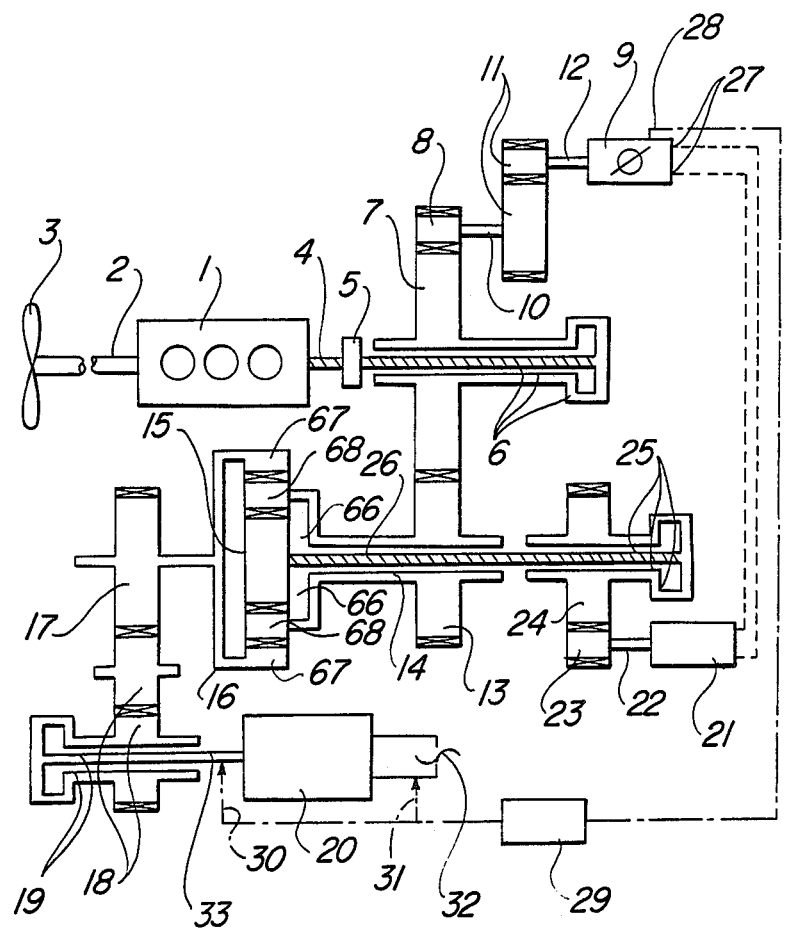
FIG. 7 is a schematic illustration of an electrical generator drive according to the invention, incorporated in drive train of a ship.

FIG. 7 shows one preferred embodiment by which the principle disclosed herein may be put into effect. A prime mover 1, for example a diesel engine, drives a propeller 3 via shaft 2. At the other end of the prime mover, power is taken via a shaft 4, a clutch or flexible coupling 5 and a cardan shaft/flexible coupling 6 to a gear wheel 7. A pinion 8 meshes with gear wheel 7 and drives hydraulic pump/motor 9 via shaft 10, step-up gearing 11 and shaft 12. A second gear wheel 13 also meshes with gear wheel 7. Gear wheel 13 is fast with a member 14 which also acts as the carrier 66 supporting the plurality of planetary pinions 65 of epicyclic gear 15; thus the planet carrier 66 forms the input member of epicyclic gear 15 which, in this embodiment, is operated in the Solar configuration.

The output member of epicyclic gear 15 is the annulus wheel 67 which is rotationally fast with a member 16. Gear wheel 17 is also rotationally fast with member 16 so that the output from epicyclic gear 15 passes via member 16 into gear wheel 17, thence via step-up gearing 18, cardan shaft/flexible coupling 19 and shaft 33 to generator 20. The ratio of epicyclic gear 15 may be varied by controlled rotation of the sun wheel 64. The speed and direction of rotation of the sun wheel 64 may be controlled by hydraulic pump/motor 21 which drives, via shaft 22, a pinion 23 meshing with gear wheel 24. Flexible coupling/cardan shaft 25 is rotationally fast with gear wheel 24 to transmit the drive via shaft 26 into sun wheel 64. Shaft 26 is co-axial with gear wheels 24 and 13 and member 14. Hydraulic pump/motor 21 is connected via piping 27 to pump/motor 9 to from a pair, of which one would have a fixed displacement and the other would have the reversible variable displacement swash plate.

Flexible couplings/cardan shafts 6, 19 and 25 are typical of the sort of arrangements used to rotatably connect fixed members. Other types of coupling are equally possible. Also, a clutch which may be located in member 5 could equally well be located in the position of members 6, 19 or 25.

A control unit 29 is fed with an input signal which could either be a direct measure of the speed of rotation 30 of generator drive shaft 33 (or some other suitable shaft) or some property dependent upon the speed of rotation of generator shaft 33, e.g. the frequency 31 of the alternating current 32 generated. Control unit 29 would compare the value of input signal 30 or 31 with the value stored in its memory and, if it differed by more than a defined amount, would produce an output signal 28 to alter the setting of the swash plate on hydraulic pump/motor 9. This action would cause the flow of hydraulic fluid in pipes 27 to change so that speed of rotation (and possibly the direction of rotation as well) of pump/motor 21 would also change resulting in a new speed and/or direction of rotation of sun wheel 64 of epicyclic gear 15. The new conditions now prevailing in the epicyclic gear 15 should restore the original speed of rotation of annulus wheel 67 and hence of generator shaft 33.

It will be noted that gear wheels 7 and 13, the configuration of epicyclic gear 15 and gear wheels 17 and 18 all give step-up ratios so that the speed of rotation gradually increases from, say, 65–100 RPM for a direct drive diesel engine or 400–800 RPM for a medium speed diesel engine driving through a gearbox to the 1200 or 1800 RPM required for a marine generator generating 60 Hz current. If the prime mover was a turbine operating at tens of thousands of revolutions per minute, the gear wheels 7, 13, epicyclic gear 15 and gear wheels 17 and 18 would have step-down ratios.

In a typical case, engine 1 may have a fuel efficient cruising speed of, say, P RPM and the gear ratios through the train would be so chosen that the correct alternator speed would be achieved with the reaction member of the epicyclic gear 15, i.e. sun wheel 64, not rotating. This would mean that pump/motor 21 was not rotating and that the swash plate of pump/motor 9 was set to zero so that no hydraulic fluid flowed in pipes 27.

Consider now that the speed of prime mover 1 feel below P RPM. The whole train would slow down and input signal 30 or 31 would depart from the pre-set value stored in the memory of control unit 29. This would cause control unit 29 to generate an output signal 28 dependent in magnitude on the difference between input signal 30 or 31 and the pre-set value stored in the memory. Output signal 28 would cause the swash plate control on pump/motor 9 to be moved by an appropriate means, e.g. a Servo mechanism (not shown) to, say, a positive setting. This would cause pump/motor 9 to act as a pump and cause hydraulic fluid to flow along pipes 27 thus making pump/motor 21 act as a motor and turn sun wheel 64 in a positive direction via the drive train consisting of members 22, 23, 24, 25 and 26. Thus there would be rotational input to epicyclic gear 15 via both sun wheel 64 and planet carrier 66 so that the speed of annulus wheel 67 would rise, as would the speeds of members 16, 17, 18, 19 and 33 thus restoring the speed of generator 20 to its former level and input signal 30 or 31 to the pre-set value stored in the memory of control unit 29. Having thus restored the input signal 30 or 31 to its pre-set value, the setting of the swash plate unit would remain fixed in that position until a further change in the speed of prime mover 1 occurred.

The operation of control unit 29 has been described in simple terms above to explain the basic principle. It is now necessary to consider the detailed operation of the system in relation to its environment, and detailed construction and operation of the control unit 29 will be described later with reference to FIG. 8 of the drawings. Reference will continue to be made to the marine application, though the arguments apply equally to other generators, whether driven by wave or wind power, etc.

Consider a ship at sea. Under normal conditions, the vessel will operate at a fuel-efficient cruising speed with only minor and progressive changes of engine speed. However, when storms occur, the ship will roll and pitch such that the propeller 3 will approach the surface of the sea and possibly partially, or even wholly, come out of the water. As the propeller approaches the surface, air bubbles will be formed due to cavitation, the resistance to rotation will fall and the rotational speed of the propeller will progressively rise. If the propeller breaks the surface of the sea the resistance to rotation will suddenly decrease and the speed of the propeller will rise in a stepwise fashion. As the propeller 3 is connected directly to the prime mover 1, the whole power train will be subject to the same rates of speed change.

Thus a control unit 29 is required which can react to both progressive and stepwise speed changes in the prime mover. Thus, the propeller 3 will be wholly or partially out of the water for only a relatively short time before the ship starts to pitch in the reverse direction causing it to be reimmersed. Thus there is great danger that a rapidly-varying input speed may cause the control unit 29 to "hunt" and set up oscillations in the speed of the components of the generator drive train. Oscillations in drive trains are never acceptable and particularly not when the magnitude of the rotational inertias involved is large. For example, for an 84,000 Tonne product tanker:

| | |
|---|---|
| Mass of propeller = | 35.1 Te |
| Reciprocating mass of engine = | 63.825 Te |
| Max. normal speed of engine = | 83 rpm |
| Rotational inertia of engine at 83 rpm = | 266.551 × $10^3$ kgm$^2$ |
| Alternator rating = | 1,500 kW |
| Alternator speed = | 1,800 rpm |
| Rotational inertia of alternator at 1,800 rpm = | 0.327 × $10^3$ kgm$^2$ |

Figure 8:
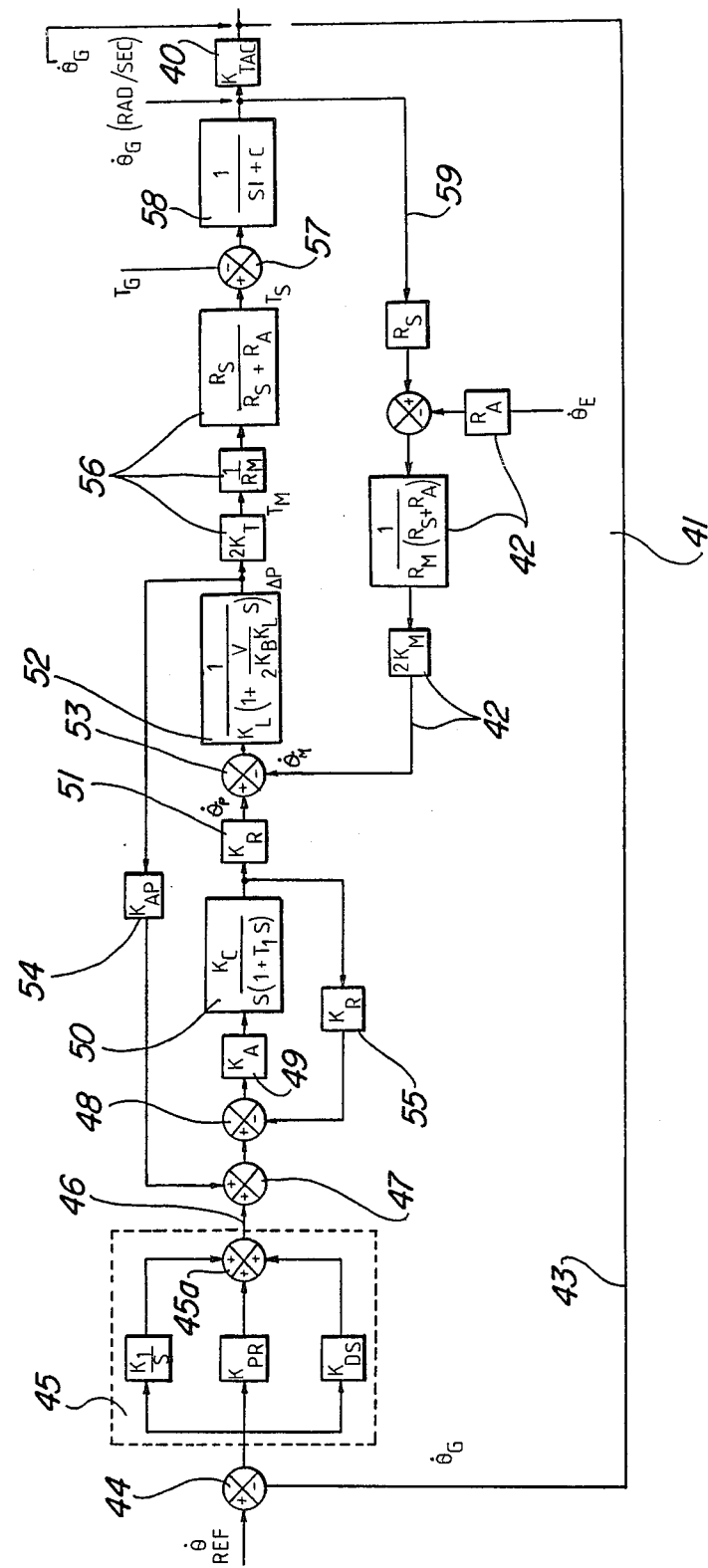
FIG. 8 is a schematic illustration of an electrical control unit employed in the electrical generator drive in order to cause automatic compensation for speed fluctuations of the power source in order to maintain a substantially constant input speed to an electrical generator.

It will thus be evident that a highly sophisticated control system, capable of rapid response and able to minimize torque fluctuations in the gearing trains, is needed. A complex electronic control system as shown in FIG. 8 must be used to achieve these requirements. Conventional hydraulic control systems are too slow in their operation and can lead to "hunting" when subject to rapid speed fluctuations. Simple electronic control systems may have a rapid enough response time, but "hunting" is also likely to be a problem. The system shown in FIG. 8 can provide the rate of response needed without "hunting" occurring. However, even with such a sophisticated system, torque fluctuations will occur in the gear train. This is why torsional flexibility is incorporated through the drive train from prime mover 1 to generator 20 via flexible coupling 5, and cardan shafts 6, 19 and 25.

FIG. 8 is a transfer function block diagram of the control system. This is an analogue model of the system and is used to show the parameters of the system and their interactions when changes occur. It must also be borne in mind that the control means is a dynamic system and, when required, all react to a continuously varying input.

In FIG. 8, the symbols used have the following means:

| | | |
|---|---|---|
| KI | INTEGRAL GAIN | |
| KPR | PROPORTIONAL GAIN | ⎫ P.I.D. |
| KD | DERIVATIVE GAIN | ⎬ CONTROLLER |
| KA | SERVO AMPLIFIER GAIN | |
| KC | SWASH GAIN | |
| TI | SWASH TIME-CONSTANT | |
| KR | SWASH POTENTIOMETER GAIN | |
| KP | HYDRAULIC PUMP FLOW CONSTANT | |
| KΔP | DIFFERENTIAL PRESSURE FEEDBACK GAIN | |
| KL | CO-EFFICIENT OF HYDRAULIC LEAKAGE | |
| V | VOLUME OF HYDRAULIC FLUID UNDER COMPRESSION | |
| KB | BULK MODULUS OF HYDRAULIC FLUID | |
| KT | HYDRAULIC MOTOR TORQUE CONSTANT | |
| KM | HYDRAULIC MOTOR FLOW CONSTANT | |
| KTAC | TACHOGENERATOR GAIN | |
| RA | ANNULUS RADIUS | ⎫ CONTROL EPICYCLIC |
| RS | SUN RADIUS | ⎭ |
| RM | GEAR RATION, HYDRAULIC MOTORS TO CONTROL CARRIER | |

Assume that the system has been operating at a constant engine speed and is in equilibrium, with the generator rotating at the desired 1800 rpm. In this case, the signal from the tachometer 40 $\dot{\theta}_G$, is a constant value equivalent to 1800 rpm. Similarly the engine speed $\dot{\theta}_E$ is constant. (N.B. The engine speed does not have to be measured by the control unit 29, but it is included in the analogue logic).

Consider now that the engine speed $\dot{\theta}_E$ 41 falls. This will have a double adverse effect as the speed of pump-/motor 9 will fall via gearing 8 and 11, and the speed of the carrier of epicyclic gear 15 will fall via gearing 7 and 13. Thus as the speed of rotation of both input members of epicyclic gear 15 falls, the speed of the output annulus member of epicyclic gear 15 will also fall but by a greater amount due also to the effect of the epicyclic gear ratio. This double adverse effect is fed into the system via logic elements 42 as a signal $\dot{\theta}_M$. As the speed of the annulus member of epicyclic gear 15 falls, so does the speed of generator 20 causing the tachometer 40 to produce a (negative signal $\dot{\theta}_G$, which is passed via connection 43 to comparator 44. $\dot{\theta}_G$ is compared with the reference value $\theta_{ref}$ stored in the comparator's memory and a signal representing the sign and magnitude of the difference between $\dot{\theta}_G$ and $\theta_{ref}$ is passed to P.I.D. controller 45. P.I.D. controller 45 contains integral, proportional and derivative gain components to determine what is actually occurring to the tachometer reading and its rate of change. Inside the P.I.D. controller 45, a comparator 45A assess the three components and produces the correct output signal 46. The integral, proportional and differential gains of P.I.D. controller 45 are preset for the required accuracy of control and speed of response.

Signal 46 is passed via two further comparators 47 and 48 and thence to amplifier 49 which sends an amplified signal (not shown) to alter the swash plate angle. Blocks 50, 51 and 52 represent the swash plate dynamic (gain and time constant including servo control), pump flow constant and properties of hydraulic fluid, etc., respectively. Two feed back loops are employed in this part of the analogue model. The differential pressure feedback 54 allows for the change in leakage in the hydraulic pump/motors due to the changes in swash plate angle and load; this is an important factor as it stops "hunting". The potentiometer feedback 55 is a critical factor in achieving the required speed of response as it ensures the swash plate is moved to the new setting as quickly as possible and then rapidly damps any resulting fluctuations. Both feedback signals 54 and 55 are fed into comparators 47 and 48 respectively to modify signal 46 before it is amplified 49 and sent to the swash plate servo (not shown).

The change in the flow of hydraulic fluid from pump/motor 9, $\theta_M$, is introduced into the analogue logic via element 53.

From element 52, the analogue model then incorporates the motor torque constant, intermediate gearing and epicyclic gearing ratios 56. The electrical load torque, $T_G$ on generator 20, is represented as an input 57 and by block 58. As the load demanded from generator 20 varies, the power input in shaft 33 will vary in a similar manner; variation in power transmission in the constant speed drive will affect other parts of the power train, particularly if part of the power of the epicyclic gear is passing via the hydraulic path. The torque T could be measured if required and used as an input to the control system 29. However, in practise this is not necessary, as the changing load would cause speed variations in the generator, which would be recorded by the tachometer 40; this effect is shown by connection 59.

The control system described above uses only one input measurement, i.e. the speed of rotation of generator 20 or the frequency of the output current (60 Hz), yet it can accommodate external influences, such as variations in engine speed or electrical demand, and internal influences, such as variations in hydraulic fluid flows, swash plate angle, leakage as well as the various gains, gear ratios, time constants and physical properties of the components of the system. Despite these influences, the control system has been proved to maintain the frequency of the power generated at 60 Hz±1%, with the ship's engine varying in speed between 58 and 83 rpm; this satisfies the requirements of Lloyds Rules and Regulations.

In practice on a ship there would be at least two generators. One would be driven from the prime mover 1 for use at sea. A second would be driven by a separate diesel engine for use in port. "Droop Control" (not shown) is incorporated into the control system, described above, to permit load sharing and load transference between the two (or more) generators.

Returning now to the mechanical functions of the generator drive train, there are two power paths to the epicyclic gear 15 which are:

(i) direct power into the planet carrier C via the mechanical path formed by members 4, 5, 6, 7, 13 and 14.

(ii) indirect power into the sun wheel 64 via the two hydraulic pump/motors 9, 21 and interconnecting piping 27 in a non-mechanical path.

Both the above paths put power into the epicyclic gear 15 the output from which, via annulusgear 67, drives the generator.

If the speed of prime mover 1 now rises to a value greater than P RPM, the whole train will speed up accordingly and input signal 30 or 31 would again depart from its pre-set value as stored in the memory of the control unit 29. In this instance the sign of the difference between the magnitudes of input value 30 or 31 and the value in the memory would be different to that previously so that the output signal 28 generated by control unit 29 would cause the setting of the swash plate of pump/motor 9 to be moved to a negative position. Thus, hydraulic fluid will flow in the opposite direction along pipes 27 and pump/motor 21 and sun wheel 64 of epicyclic gear 15 will both rotate in the negative sense. In this case, pump/motor 21 would act as a pump and pump/motor 9 would act as the motor. Here the two power paths to the epicyclic gear become:

(i) direct power into the planet carrier 66 via the mechanical path formed by members 4, 5, 6, 7, 13 and 14.

(ii) indirect power out of the sun wheel 64 via the two hydraulic pump/motors 9, 21 and interconnecting piping 27 in a non-mechanical path. In this case, power is passed into the epicyclic gear 15 via the planet carrier 66 and out via the annulus gear 67 to drive the generator, with the excess power being removed via the sun wheel 64. Thus a partial power recirculation loop is set up via members 15S, 26, 25, 24, 23, 22, 21, 27, 9, 12, 11, 10, 8 back to gear wheel 7.

It is also possible to use a hydraulic pump/motor 9 with only a variable swash plate i.e. not a reversible one. In this case, the swash plate of pump/motor 9 could be set to an intermediate point of its travel when prime mover 1 was operating at its cruising speed of P RPM. If the speed of the prime mover fell below P RPM, the angle of the swash plate of pump/motor 9 would be increased so that the speed of pump/motor 21, and hence also of sun wheel of epicyclic gear 15, would increase to compensate for the reduction in speed of member 14. Conversely, if the speed of the prime mover rose above 65, the angle of the swash plate of pump/motor 9 would be reduced to reduce the speed of pump/motor 21 and sun wheel of epicyclic gear 15. When a non-reversible swash plate pump/motor 9 is used, power is always put into epicyclic gear 15 via both the mechanical and hydraulic paths and no power recirculation loop is possible.

As the power carrying capacity of hydraulic pump/motors is limited, installations for the generation of substantial quantities of electrical power would be likely to prefer a reversible variable swash plate hydraulic pump/motor 9, so that only a minimum amount of power would be transmitted in the non-mechanical path.

Though the embodiment shown in FIG. 7 may at first sight seem complicated, the arrangement is designed for high reliability and easy access for maintenance in the confined space of a ship's engine room. Further reductions of space and increase in reliability may be obtained if the power in epicyclic gear 15 is carried uniformly by all the planetary pinions 65. This can be achieved by the use of load sharing elements to support the planetary pinions 65 from the planet carrier 66 such as flexible pins as disclosed in more detail in U.K. Patent Specification No. 1,101,131.

The purpose of this disclosure is to so control the speed of the reaction member of epicyclic gear 15 that a constant speed output may be obtained. This control has been described using hydraulic means, but could equally well be performed by a variable speed or reversible and variable speed electric or pneumatic motor.

Although not illustrated, natural power sources may be used to drive the apparatus which have fluctuating outputs, such as air or wind-driven devices, water driven devices, and devices which take energy from wave-motion as described for example in U.K. Patent Specification No. 1,601,467.

We claim:

1. An electrical generator drive having a power source which is able to transmit power at a rotational speed subject to progressive and stepwise speed changes, an electrical generator which requires a rotational input of power at a substantially constant speed, and a controllable drive transmission of high rotational inertia coupling together the power source and the electrical generator, said drive transmission comprising:

an epicyclic gear having an input member which is arranged to be driven by said power source, an output member coupled with said electrical generator, and a reaction member;

monitoring means arranged to respond to fluctuations from a predetermined value in the rotational speed of the output member;

and control means including a hydraulic pump/motor unit coupled with said reaction member and controllable by the monitoring means in order to vary the relative rotation between the reaction member and the other members of the epicyclic gear so as to maintain a substantially constant predetermined speed of the output member;

in which:

the monitoring means includes an electrical control unit having a memory storable with a predetermined value corresponding to the predetermined speed of the output member, means for feeding to the control unit an input signal which represents the actual speed of the output member and which the control unit compares with the predetermined speed of the output member, and an electrical control line from the control unit to said pump/motor unit via which the control unit controls the operation of the pump motor unit to cause alteration in the relative rotation of the reaction member, when a fluctuation occurs in the speed of the output member, and such as to restore the speed of the output member to the predetermined speed;

and the drive transmission also includes at least one flexible coupling for torsionally absorbing at least part of any speed fluctuations imparted to the drive transmission via the power source and the input member.

2. An electrical generator drive according to claim 1, in which the power source is the prime mover of a marine vessel.

3. An electrical generator drive according to claim 2, in which the drive transmission comprises an input shaft which is coupled with the prime mover, a cardan shaft coupled with the input shaft via a first flexible coupling, a gear wheel rotatable with the carden shaft and coupled with the input member of the epicyclic gear, a further gear wheel rotatable with the output member of the epicyclic gear, and a further cardan shaft arranged to drive the electrical generator and coupled with said further gear wheel.

4. An electrical generator drive according to claim 1, in which the electrical generator is an A.C. generator, and the monitoring device is arranged to monitor the frequency of the A.C. generator.

5. An electrical generator drive according to claim 1, in which the control means comprises a linked pair of first and second hydraulic pump/motors, one of which is of variable displacement, and said first pump/motor being arranged to be driven directly by the drive transmission and said second pump/motor being coupled with said reaction member of the epicyclic gear, and in which said monitoring means is operable to control the setting of the variable displacement pump/motor so that said second pump/motor can vary the relative rotation between the reaction member and the other members of the epicyclic gear and thereby maintain the substantially constant predetermined output speed of the output member, when fluctuation occurs in the speed of the input member.

6. An electrical generator drive according to claim 1, in which the power source comprises a fluid-driven device.

7. An electrical generator drive according to claim 6, in which the fluid-driven device comprises a rotary wind-driven device.

8. An electrical generator drive according to claim 1 wherein said members of said epicyclic gear are constituted by a sun wheel, a carrier supporting a plurality of planetary pinions each of which is in driving engagement with the sun wheel, and an annular gear in driving engagement with said planetary pinions.

* * * * *